US006594425B2

(12) United States Patent
Tapalian et al.

(10) Patent No.: US 6,594,425 B2
(45) Date of Patent: Jul. 15, 2003

(54) MICROCAVITY-BASED OPTICAL CHANNEL ROUTER

(75) Inventors: Haig Charles Tapalian, Canton, MA (US); Juha-Pekka Laine, Boston, MA (US)

(73) Assignee: The Charles Stark Draper Laboratory, Cambridge, MA (US)

( * ) Notice: Subject to any disclaimer, the term of this patent is extended or adjusted under 35 U.S.C. 154(b) by 0 days.

(21) Appl. No.: 09/941,308

(22) Filed: Aug. 29, 2001

(65) Prior Publication Data

US 2002/0044734 A1 Apr. 18, 2002

Related U.S. Application Data

(60) Provisional application No. 60/228,594, filed on Aug. 29, 2000.

(51) Int. Cl.[7] ................................................. G02B 6/26
(52) U.S. Cl. ............................. 385/50; 385/27; 385/28; 385/30
(58) Field of Search .......................... 385/50.24, 11.27, 385/30; 359/486.127; 372/92, 108

(56) References Cited

U.S. PATENT DOCUMENTS

| | | | | |
|---|---|---|---|---|
| 4,089,582 A | * | 5/1978 | Mahlein et al. ............. | 359/486 |
| 5,077,822 A | * | 12/1991 | Cremer ......................... | 385/11 |
| 5,682,401 A | * | 10/1997 | Joannopoulos et al. ....... | 372/92 |
| 5,742,633 A | | 4/1998 | Stone et al. | |
| 6,009,115 A | | 12/1999 | Ho | |
| 6,058,127 A | | 5/2000 | Joannopoulos et al. | |
| 6,130,969 A | | 10/2000 | Villeneuve et al. | |
| 6,507,684 B2 | * | 1/2003 | Tapalian et al. .............. | 385/30 |

OTHER PUBLICATIONS

Laine, J.P. et al., Silica microsphere resonator and Sparrow waveguide coupler structures, Integrated Photonics Research 2000, OSA Technical Digest, Quebec City, Canada, Jul. 2000.

Laine, J.P. et al., Microsphere resonator mode charaterization by pedestal anti–resonant reflecting waveguide coupler, IEEE Photonics Technology Letters, vol. 12, 1004–1006, 2000.

Little, B. et al., Pedestal antiresonant reflecting waveguides for robust coupling to microsphere resonators and for microphotonic circuits, Optics Letters, vol. 25, No. 1, pp. 73–75, Jan. 2000.

Laine, J.P. et al., Novel techniques for whispering–gallery–mode excitation in silica microspheres, Integrated Photonics Research 1999, OSA Technical Digest, Santa Barbara, California, Jul. 1999.

Laine, J.P. et al., Planar integrated wavelength–drop device based on pedestal antiresonant reflecting waveguides and high–Q silica microspheres, Optics Letters, vol. 25, No. 22, 1636–1638 Nov. (2001).

* cited by examiner

Primary Examiner—Ellen E. Kim
(74) Attorney, Agent, or Firm—McDermott, Will & Emery

(57) ABSTRACT

An optical channel add/drop router includes at least one optical waveguide disposed on a substrate, and an optical microcavity resonator. Each waveguide includes a waveguide core, and a multi-layer dielectric stack with alternating high and low refractive index dielectric layers. Light propagates from one of the I/O ports or add/drop port of the waveguide, through one of the waveguide channels. Frequency components of the light that match a resonant mode of the microcavity are coupled into the microcavity, and out of the microcavity onto a different waveguide channel, so that desired channels are added to or dropped from the input signal. Optical power transfer efficiency of over 95% can been achieved at a transfer linewidth of about 1 MHz.

27 Claims, 6 Drawing Sheets

MICROCAVITY-BASED OPTICAL CHANNEL ROUTER

CROSS-REFERENCE TO RELATED APPLICATIONS

This application claims right of priority based on U.S. Provisional Application Ser. No. 60/228,594, filed on Aug. 29, 2000.

STATEMENT REGARDING FEDERALLY SPONSORED RESEARCH

Not Applicable

REFERENCE TO MICROFICHE APPENDIX

Not Applicable

FIELD OF THE INVENTION

The present invention relates to optical telecommunications channel routers, and in particular to a narrowband optical channel router using a waveguide-coupled microcavity optical resonator.

BACKGROUND OF THE INVENTION

There is a growing demand for increasing data transmission capacity in optical communications networks, i.e. for greater bandwidth. WDM (wavelength-division-multiplexing) systems provide a method for increasing the capacity of existing fiber optic links without physically modifying the optical fiber, by allowing multiple wavelengths to be transmitted and received over a single optical fiber. Dense WDM (DWDM) systems can be utilized to further increase information transmission capacity. DWDM systems increase the capacity of an embedded fiber by first assigning incoming optical signals to specific wavelengths within a designated wavelength band, and then multiplexing the resulting signals onto one fiber. DWDM systems combine multiple optical signals so that they can be amplified as a group, and transported over a single fiber to increase capacity. Each signal can be carried at a different rate, and in a different format. DWDM systems can multiplex and demultiplex large numbers of discrete communication channels onto a single optical fiber, and transmit these channels over long distances.

Channel routing and switching is an important function performed by DWDM network components, and allows service providers to have optical access to data at desired nodes on the network. For example, selected channels may be extracted or "dropped" from a multiplexed signal, and routed to desired nodes. Alternatively, extracted signals, or newly generated signals, may be inserted or "added" into the multiplexed signal. This extracting and inserting of optical signals is generally referred to as add/drop multiplexing, and is carried out with channel routers, typically optical wavelength add/drop (OWAD) filters.

Resonant filters are attractive candidates for performing these channel routing functions in DWDM networks, because resonators can potentially realize the narrowest linewidth for a given device size. For optimal performance, it is desirable that resonators be characterized by low loss, large free-spectral range, and processing control over spectral characteristics such as filter linewidth and resonant frequency.

During the past few years, a substantial amount of research has been performed in the field of optical microcavity physics, in order to develop high cavity-Q optical microcavity resonators. Optical microcavity resonators have quality factors that are several orders of magnitude better than typical surface etched resonators, because these microcavities can be shaped by natural surface tension forces during a liquid state fabrication. The result is a clean, smooth silica surface with low optical loss and negligible scattering. These microcavities are inexpensive, simple to fabricate, and are compatible with integrated optics.

For these optical microcavity resonators, measured Qs as large at $10^{10}$ have been reported, whereas commercially available devices typically have Qs ranging from about $10^5$ to about $10^7$. The high-Q resonances encountered in these microcavities are due to optical whispering-gallery-modes (WGM) that are supported within the microcavities. Because the ultra-high Q values of microcavities are the result of energy that is tightly bound inside the cavity, optical energy must be coupled in and out of the high Q cavities, without negatively affecting the Q. The use of SPARROW waveguides for efficiently coupling light into the microcavity resonant modes is described in detail in U.S. patent application Ser. No. 09/893,954 (hereinafter the "'954 application"), entitled "Optical Microcavity Resonator System," which is commonly owned by the present assignee and which is incorporated herein by reference. As a result of their small size and high cavity Q, microcavity resonators have the potential to provide superior performance in numerous applications, including for example applications such as optical DWDM communications systems that call for ultra-narrow linewidths.

Techniques used in the prior art for channel routing in DWDM systems include optical grating techniques and fused coupler techniques. These techniques require, at a minimum, channel spacings of about 25 GHz. The number of communication channels that can be packed within the same transmission wavelength range would be increased substantially, by reducing the channel spacing. The narrow bandwidth of the resonance modes coupled into microcavity resonators provides the potential for decreasing the channel spacings in WDM and DWDM networks by several orders of magnitude.

It is therefore desirable to effectively implement optical microcavity resonators in channel routing applications in optical telecommunications.

SUMMARY OF THE INVENTION

The present invention provides an optical channel router, based on microcavity resonator technology. In particular, the present invention features SPARROW (Stripline-Pedestal Anti-Resonant Reflecting Optical Waveguide) coupler structures for coupling optical radiation from a waveguide channel into and out of high-Q optical microcavity resonators. The narrow bandwidth of microcavity WGM (whispering gallery mode) resonances (~1 MHz) allows for in-line filtering and routing of narrowband optical communications channels. As a result of the high cavity Qs of the WGMs propagating within the microcavities, an optical channel add/drop filter as described in the present disclosure can be used to perform ultra-high resolution separation of closely spaced, narrowband optical communications channels in a ultra-dense wavelength division multiplexing network (UDWDM).

In one embodiment, the present invention features an optical channel add/drop router that includes a substrate, a first and a second optical waveguide disposed on the substrate, and at least one optical microcavity resonator.

Each optical waveguide has a SPARROW structure, composed of a multi-layer dielectric stack including alternating high and low refractive index dielectric layers, and a waveguide core disposed on the dielectric stack. The first optical waveguide defines a throughput channel between a first I/O port and a second I/O port. The second optical waveguide defines an add/drop channel between an originating end of the waveguide and an add/drop port.

The microcavity resonator is disposed on the substrate and at a distance from the optical waveguide that is sufficiently small so as to allow evanescent coupling between the microcavity and the light propagating along the waveguide. When the frequency of the light propagating along one of the waveguides is in resonance with a whispering gallery mode of the microcavity, light is coupled into the microcavity and then out of the microcavity onto the remaining one of the optical waveguides.

The channel add/drop router device can function both as a channel add filter, or a channel drop filter. When the channel router operates as a channel add filter, the add/drop port of the second waveguide functions as an add port, into which a beam of light, containing at least one frequency component that matches a resonant mode of the microcavity, is inputted. The matching frequency components are coupled into the microcavity, then out of the microcavity to be added onto another beam of light propagating through the throughput channel in the first waveguide.

When the channel router operates as a channel drop filter, one of the I/O ports of the first waveguide functions as an input port, and receives a beam of light that includes a plurality of frequency components, and that propagates along the throughput channel. Frequency components within the beam that do not match any resonant mode of the optical microcavity propagate through the throughput channel without coupling into the microcavity. Frequency components within the beam that substantially match one or more resonant modes of the optical microcavity are coupled into the microcavity, and are subsequently coupled out of the microcavity onto the drop channel, to be output from the drop port. In this way, the matching frequency components are "dropped" from the input beam of light.

Optical transfer efficiencies of more than 95% has been attained at resonant linewidths of about 1 MHz–100 MHz, using the channel add/drop router of the present invention. A multiple channel add/drop router device can be constructed, by arranging multiple microspheres in series on a single waveguide chip.

BRIEF DESCRIPTION OF THE DRAWINGS

The invention can be more fully understood by referring to the following detailed description taken in conjunction with the accompanying drawings, in which.

DETAILED DESCRIPTION

The present invention relates to an optical frequency channel router for telecommunications applications. In one embodiment, the present invention provides a micro-optical solution to ultra-dense channel routing, by utilizing high-Q optical microcavity resonators into which light is coupled using SPARROW waveguides.

Figure 1:
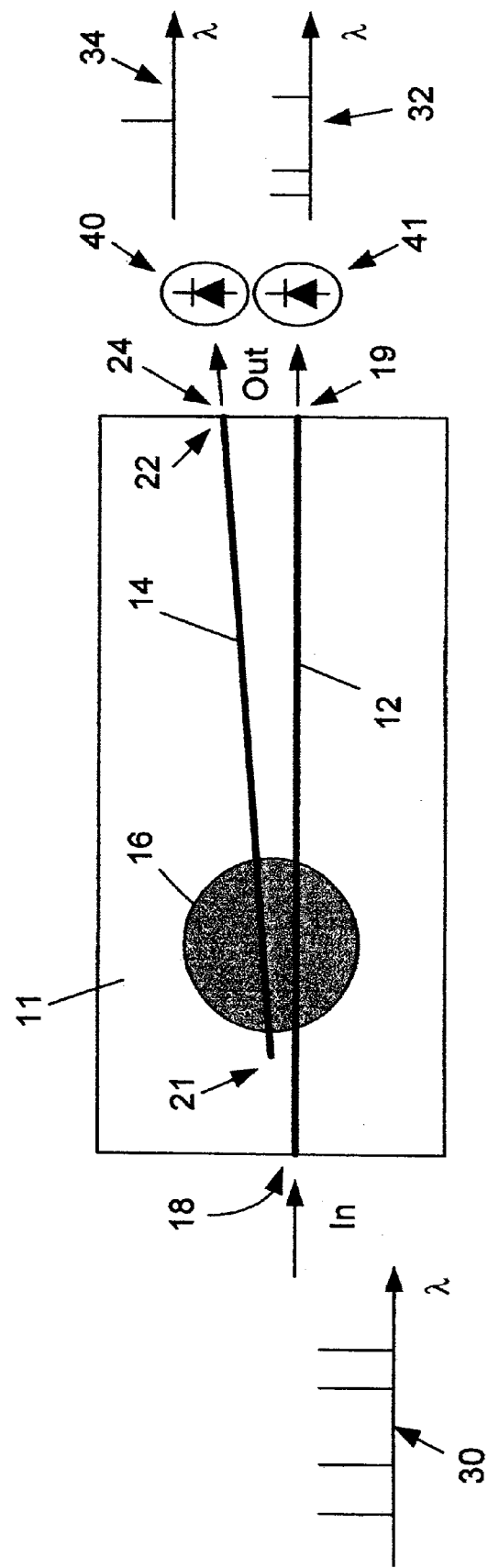
FIG. 1 is a schematic illustration of a planar wavelength add/drop optical channel router constructed in accordance with the present invention, including an optical microcavity resonator placed above and between a first and a second SPARROW waveguide. The photodetectors are present for system characterization only, and may be replaced by output fibers in a preferred embodiment of the present invention.

FIG. 1 is a schematic illustration of one embodiment of a planar wavelength add/drop optical channel router 10, constructed in accordance with the present invention. The optical channel router 10 includes a substrate 11, a first optical waveguide 12, a second optical waveguide 14, and an optical microcavity resonator 16 disposed above the waveguides 12 and 14. An optical source (not shown) provides a beam of input optical radiation directed to the first optical waveguide. The substrate, waveguides, and the microcavity resonator preferably form a single integrated chip. The substrate 11 is substantially planar, and is made of silicon in one embodiment of the invention. Both optical waveguides 12 and 14 are SPARROW waveguides. As described in more detail with reference to FIG. 2A, a SPARROW waveguide provides isolation of the waveguide core from the substrate by providing a highly reflective set of dielectric layers, thus allowing efficient, low-leakage coupling between the core mode and the resonant modes of the microcavity.

The first optical waveguide 12 extends across the substrate chip 11, and includes a first I/O port 18 and a second I/O port 19. The first optical waveguide 12 defines a throughput channel between the first I/O port 18 and the second I/O port 19. The second waveguide 14 includes an originating end 21 and a terminating end 22. An add/drop port 24 is disposed at the terminating end 22. The second waveguide 14 defines an add/drop channel between the originating end 21 and the terminating end 22. The first 12 optical waveguide and the second 14 optical waveguide are disposed adjacent to and spaced apart from each other. In the illustrated embodiment, the two waveguides diverge slowly, the initial separation between the first and the second waveguides being about 2 $\mu$m, and the separation expanding to about 50 $\mu$m at the chip output facet.

The optical microcavity resonator 16 is positioned above and between the two pedestals. Optical microcavities are small spherical particles, disks, or rings, having dimensions of the order of microns to millimeters. In the illustrated embodiment of the invention, the optical microcavity is a substantially spherical particle, typically made of silica. In a preferred embodiment, the optical microcavity 16 is fabricated by surface tension shaping of the tip of freshly melted optical fiber. Melting of the tip of a silica wire or fiber may be accomplished through arcing in a fusion splicer, by means of a gas flame, or using a high-power laser (such as a $CO_2$ laser) to heat the glass. Microspheres, with diameters typically ranging from about 50 micrometers to about 500 micrometers, are obtained by this method. In the illustrated embodiment, the optical microcavity has a diameter of about 250 micrometers, although other sizes are also within the scope of the present invention. The fiber stem may be left attached, and used for maneuvering the sphere 16 relative to the waveguides 12 and 14.

FIG. 1 depicts an embodiment in which the add/drop optical channel router 10 functions as a channel drop filter, and a beam of light including a plurality of frequency components is received at the first I/O port. However, the add/drop optical channel router 10 can act both as a channel add filter and as a channel drop filter. Both the first and the second I/O ports can thus be utilized for either optical power insertion or for optical throughput detection. In a configuration in which the channel router 10 functions as a channel add filter, the direction of propagation of light through the waveguides 12 and 14 is reversed, as compared to the configuration in which the channel router 10 functions as a channel drop filter, and the functionalities (input versus output) of the first and the second I/O ports also become reversed.

In the embodiment illustrated in FIG. 1, the first I/O port 18 of the first waveguide 12 receives a first beam of light 30, which propagates along the throughput channel from the first I/O port 18 toward the second I/O port 19. Optical power coupling into the SPARROW waveguide may be performed with a fiber placed in a V-groove assembly and bonded to the waveguide substrate. In a preferred embodiment, the first beam of light 30 includes a plurality of wavelength or frequency components. The frequency components which are resonant with the optical microcavity modes, i.e. which substantially match one or more resonant modes of the microcavity, are coupled into the microcavity, and then are coupled out of the microcavity onto the add/drop channel defined by the second waveguide 14. The remaining components in the first beam of light propagate from the first I/O port 18 through the throughput channel, and are output from the second I/O port 19. In this way, frequency components in the first beam 30 that match a resonant mode of the microcavity are "dropped" from the first beam 30. If the add/drop device is placed at a terminus of a communication network, then photodetectors 40 and 41 may be placed at one or both of the I/O ports 19 and 24.

In a second state, the channel add/drop router 10 acts as a channel add filter. While this state is not illustrated separately, the second state can be envisioned from FIG. 1 by reversing the direction of propagation of the light beams passing through the optical waveguides 12 and 14, so that input light enters from the two-channel end of the chip, i.e. from the side of the chip 11 in which the second I/O port 19 and the add/drop port 24 are located. In this second state, the second I/O port 19 of the first waveguide 12 functions as a input port. The second I/O port 19 receives a first beam of light 32, which propagates along the throughput channel from the second I/O port 19 toward the first I/O port 18. Also, the add/drop port 24 of the second waveguide 14 receives a second beam of light 34, which propagates toward the originating end 21 of the second waveguide 14.

In the second state, the second beam of light 34 preferably includes at least one frequency component which substantially matches one or more resonant modes of the microcavity. The matching frequency component is coupled into the microcavity 16, and is then coupled out of the microcavity 16 onto the throughput channel defined by the first waveguide 12. In this way, frequency components in the second beam 34 that match a resonant mode of the microcavity 16 are "added" onto the first beam 32 that is propagating along the throughput channel.

Figure 2:
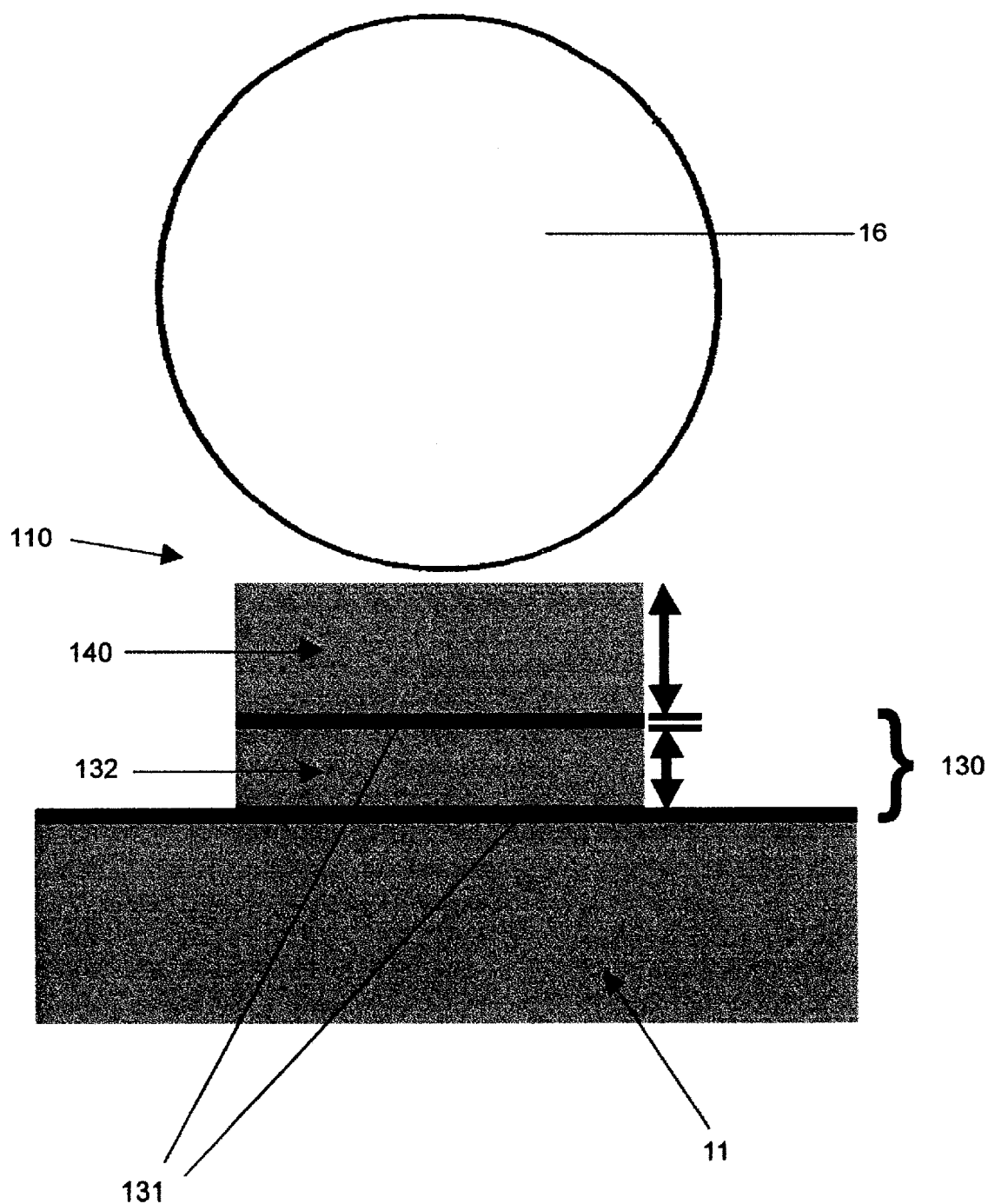
FIG. 2A illustrates a SPARROW waveguide, used in a channel add/drop filter constructed in accordance with the present invention.
FIG. 2B illustrates evanescent coupling of optical radiation from a SPARROW optical waveguide onto a WGM resonance mode supported within an optical microcavity resonator.
Figure 2:
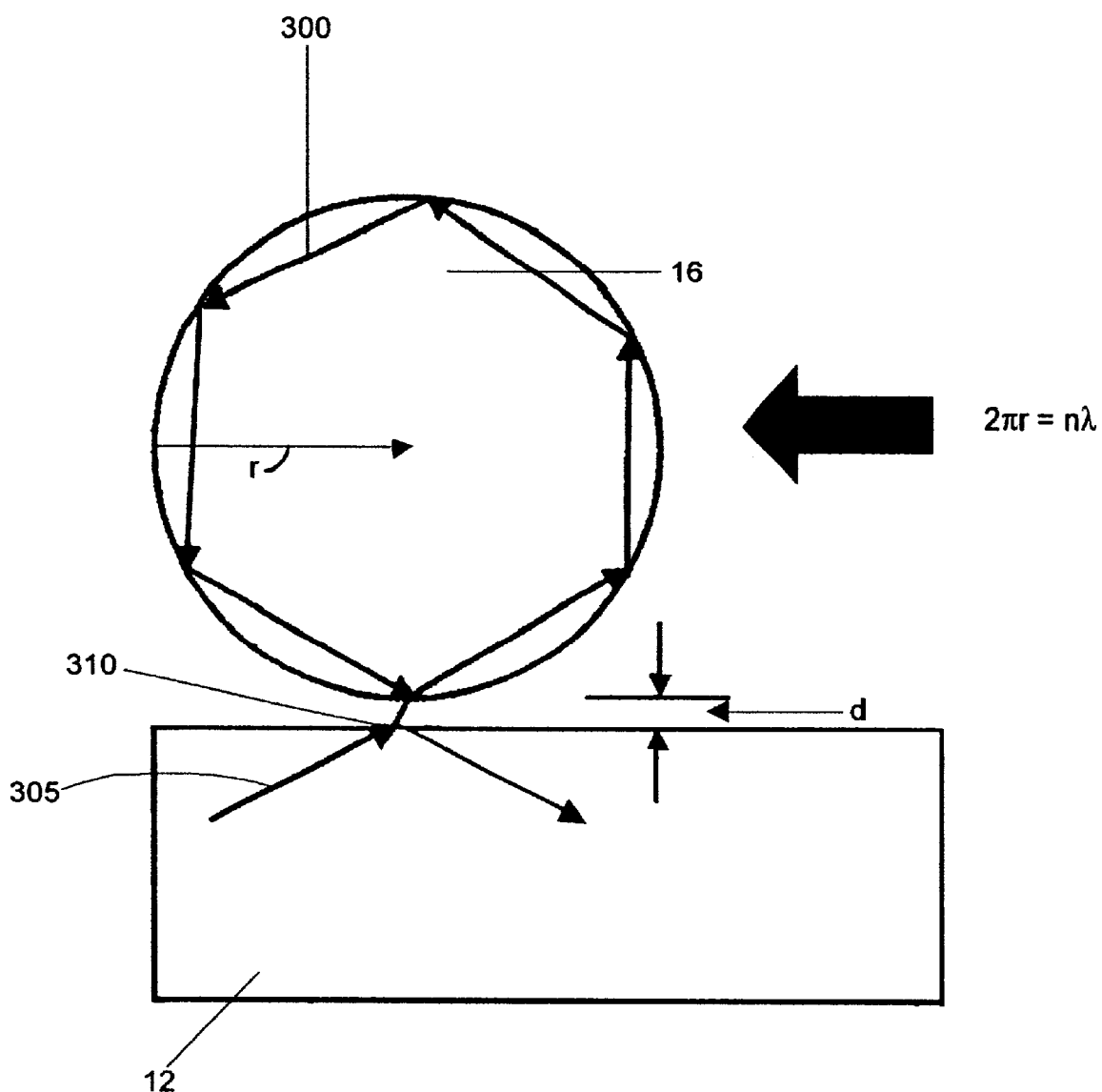

The SPARROW design avoids leakage issues by isolating a silica waveguide core with a high-reflectivity stack composed of alternating high- and low-index layers of Si and $SiO_2$. FIG. 2A provides a more detailed illustration of a SPARROW waveguide 110, used in a channel add/drop router 10 constructed in accordance with the present invention. The SPARROW waveguide 110 provides an efficient and robust coupling mechanism for exciting whispering-gallery-modes in an optical microcavity 16. The SPARROW 110 includes a multi-layer, high-reflectivity dielectric stack 130 disposed on a substrate 11, and a waveguide core 140.

The dielectric stack 130 is composed of alternating high ($n_H$) and low ($n_L$) refractive index layers 131 and 132, made of a dielectric material. As a result, the dielectric stack 130 functions as a high reflectivity dielectric mirror. The larger the number of layers 131 and 132, the higher the reflectivity of the stack 130 becomes. While the illustrated embodiment includes only one low index layer 132 disposed between two high index layers 131, the number of the layers 131 and 132 can be increased in order to increase the reflectivity of the stack 130. The alternating layers 131 and 132 forming the dielectric stack 130 provide a cladding for the SPARROW waveguide core 140, i.e. the layers forming the stack 130 may be regarded as cladding layers.

The high reflectivity of the dielectric stack 130 permits isolation of the optical modes of a microcavity resonator 16 and the waveguide core 140 from the waveguide cladding and the substrate 11. By isolating the waveguide core 140 using the high-reflectivity dielectric stack 130, the SPARROW 110 circumvents the need for obtaining low refractive index cladding materials. As shown in FIG. 2A, one of the high refractive index layers 131 is in contact with the substrate 11. In a preferred embodiment, the high refractive index layer 131 is made of Si (silicon), while the low refractive index layer 132 is made of $SiO_2$ (silica). The refractive indices required for efficiently guiding light within the waveguide depend on the wavelength of optical radiation. The waveguide core 140 is disposed on top of the dielectric stack 130, and is in contact with another one of the high refractive index layers 131. In one embodiment, the waveguide core is made of silica, and is characterized by the low refractive index $n_L$.

The SPARROW waveguides 12 and 14 (shown in FIG. 1) may be fabricated by a combination of thermal oxidation on a silicon wafer, low-pressure chemical vapor deposition, and reactive ion etching. In an exemplary embodiment illustrated in FIG. 2A, the silica waveguide core has a thickness of approximately 2.1 $\mu m$, while the high refractive index layers 131 are composed of 120 nm of amorphous silicon.

Referring back to FIG. 1, the microcavity resonator 16 is disposed within evanescent coupling distance of both the first 12 and the second 14 optical waveguides, so that frequency components of the light passing through either waveguide is coupled into and out of the microcavity resonator 16. FIG. 2B illustrates evanescent coupling of optical radiation from a SPARROW optical waveguide 12 onto a WGM resonance mode supported within an optical microcavity resonator 16. An evanescent wave appears whenever a light wave 305 undergoes total internal reflection at a dielectric interface, such as the interface 310 between the silica waveguide 12 and the surrounding air. As can be seen from the depiction of total internal reflection as illustrated in FIG. 2B, a SPARROW waveguide has a higher index of refraction, as compared to the surrounding air. The evanescent portion of the waveguide mode field is the exponentially decaying portion of the waveguide mode field, outside the relatively high index region of the waveguide.

The evanescent wave decays exponentially with the distance from the surface of the waveguide core on a length scale of the order of the optical wavelength.

In the present invention, the distance d between the microcavity 16 and each SPARROW waveguide (the first SPARROW waveguide 12 and the second SPARROW waveguide 14, as illustrated in FIG. 1) is selected to be within the range for evanescent coupling between each waveguide and the microcavity 16, i.e. to be of the order of one wavelength of the optical mode propagating in each waveguide. With this configuration, evanescent coupling occurs between a waveguide and a microcavity when the wavelength of the evanescent field of the waveguide mode field matches the wavelength of a resonant WGM 300 supported within the microcavity 16. In resonant WGMs, light is trapped near the surface of the microcavity 16 by repeated total internal reflections, and travels in a circle around the microcavity 16 near the surface of the microcavity, as illustrated in FIG. 2B. The wavelengths of the resonant WGMs 300 are thus determined approximately by the radius r of the microcavity 16, i.e. WGM resonances occur at wavelengths given by:

$$2\pi r = n\lambda.$$

When WGM resonances 300 are excited in the microcavity 16, light continues to circulate just inside the surface of the microcavity, with virtually no loss except for residual absorption and scattering in the dielectric, as shown in FIG. 2B. This is why extremely high Q-factors, up to over $10^{10}$, can be achieved in these dielectric microcavities. The Q-factor of the microcavity is a measure of the frequency selectivity of the microcavity 16. The Q is given by the time averaged stored energy per optical cycle, divided by the power coupled or scattered out of the resonator, and is limited by radiation loss.

The optical power transfer in the wavelength add/drop device can be modeled analytically, in terms of the coupling coefficients for input and output coupling onto the microcavity, and the corresponding coupling constants. The steady state field amplitude $A_o$ in the output guide is given by:

$$A_0 = -[\kappa_I \kappa_0 \exp(-\Phi/2i)/(1-\alpha t_I t_0 \exp(-\Phi i)]A_I \quad (1)$$

Figure 3:
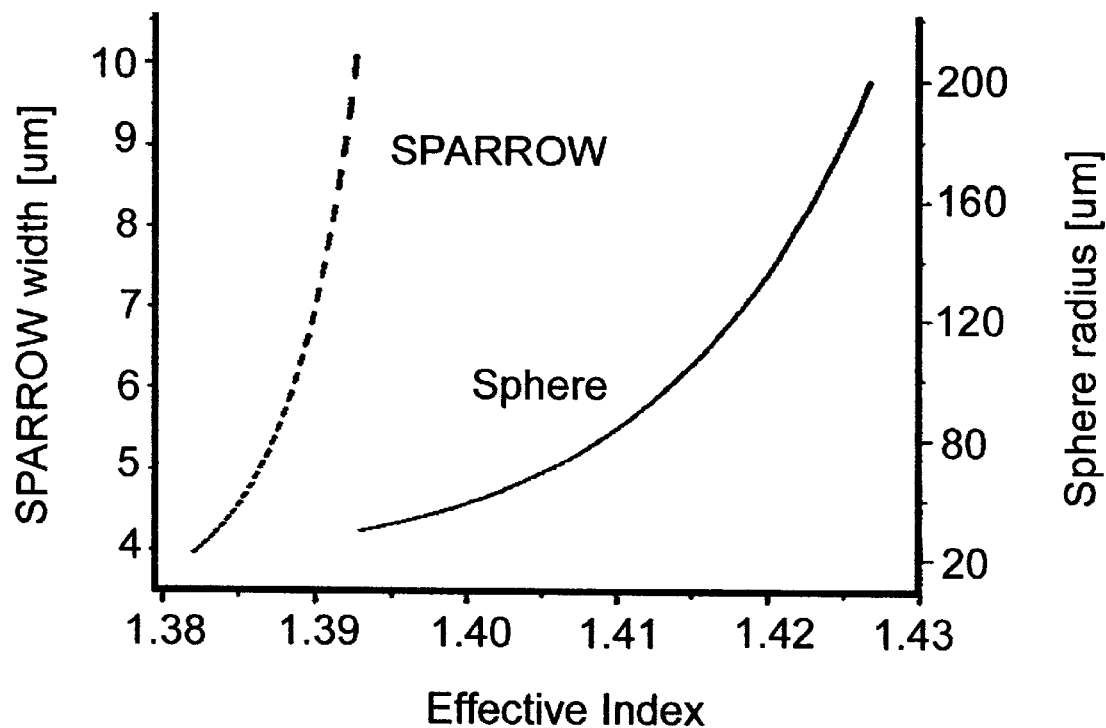
FIG. 3 is a plot of the calculated effective indices for a microcavity resonator and for the fundamental modes of a SPARROW waveguide.

In equation (1) above, $A_I$ is the input-guide field amplitude, $\kappa_I$ is the coupling coefficient for light input coupling into the microcavity, $\kappa_0$ is the coupling coefficient for light output coupling out of the microcavity, $t_I = (1-\kappa_I^2)^{1/2}$ is the equivalent input transmission coefficient, $t_o = (1-\kappa_o^2)^{1/2}$ is the equivalent output transmission coefficient, and $\alpha$ is an internal sphere transmission coefficient incorporating total loss per round trip. The phase factor is given by $\phi = 2\pi R\beta$, where $\beta$ is the sphere mode propagation constant and R sphere radius. FIG. 3 illustrates examples of fundamental-mode effective index values for various values of the sizes of the components forming a channel add/drop router in accordance with the present invention, i.e. for various values of the radius of the microcavity resonator, and the width of the SPARROW waveguide. For a microcavity radius of about 125 μm, as used in an exemplary embodiment illustrated in FIG. 3, the effective index is about 1.42.

Optical power transfer efficiency is primarily dependent on: 1) the overlap between the microcavity and waveguide mode field envelopes; 2) microcavity loss. As microcavity loss increases, transfer efficiency diminishes, broadening the drop or add signal linewidth. It is therefore desirable to use dielectric microcavity resonators that are characterized by as low a loss and as high a Q as possible. It is also important to efficiently couple light into and out of the resonant modes of such high-Q cavities, while minimizing microcavity loss. As described above, this important function is performed using a SPARROW waveguide described with reference to FIG. 2A, in a preferred embodiment of the present invention.

Referring back to FIG. 1, the field overlap, and thus the optical power transfer efficiency of the channel add/drop router 10, can be controlled by adjusting the position of the microcavity 16 relative to the waveguides 12 and 14. In practice, the shapes which are obtained for the optical microcavity 16 are not perfectly spherical. As a consequence, many different radial and polar cavity modes may be observed within the fine-tuning wavelength modulation cycle of the incident light. Each mode possesses a different linewidth, and thus a different cavity Q.

Figure 4:
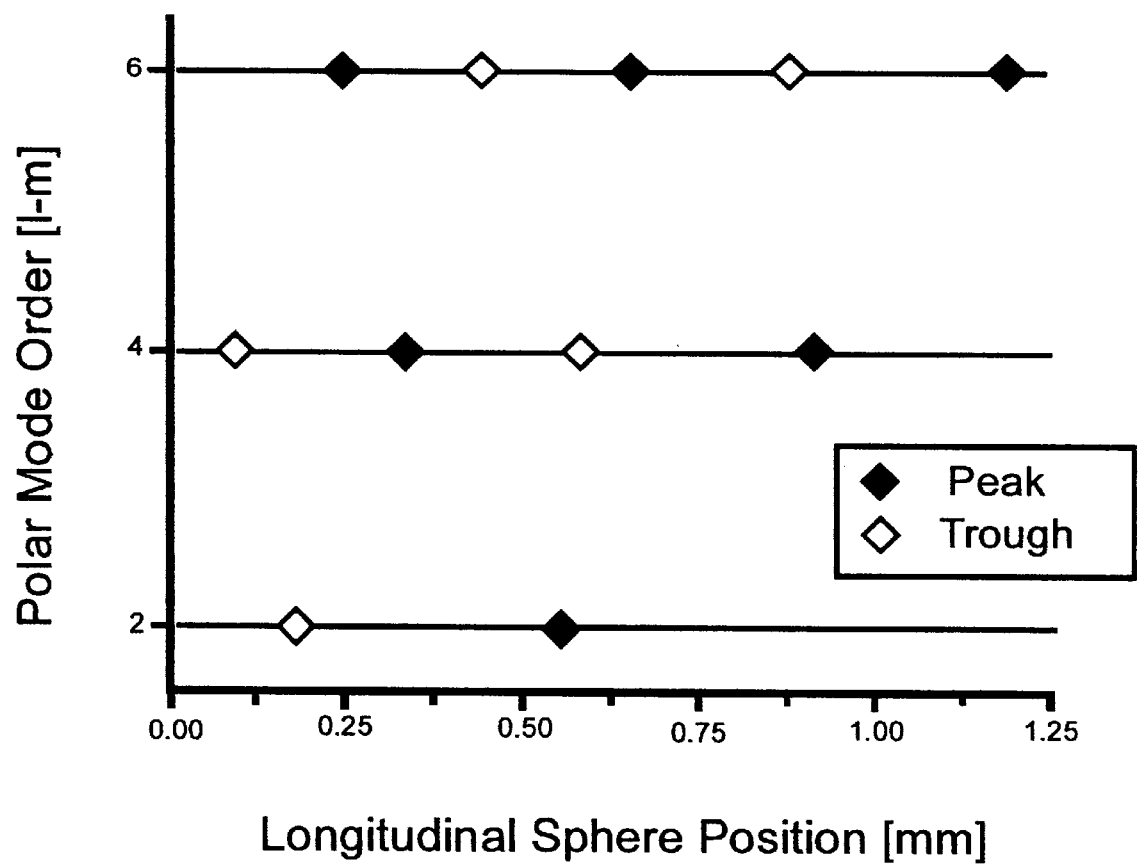
FIG. 4 is a plot of the location of guide-mode and polar-sphere-mode overlap maxima, as the microsphere is moved along the longitudinal axis separating the SPARROW waveguides.

FIG. 4 is a plot of the location of guide-mode and polar-sphere-mode overlap maxima, as the microcavity 16 is moved along a longitudinal axis separating the two SPARROW waveguides 12 and 14. In FIG. 4, sphere modes for radial quantum number l=1 and angular quantum numbers m=2, 4, 6 are plotted for a microsphere having a diameter of about 280 μm. The field overlap considerations include both the magnitude and symmetry of the overlap. These parameters can be modified by shifting the sphere's location perpendicular to the two guides. In other words, the total optical power transfer efficiency can be increased by determining the optimal spatial system parameters, since the transfer efficiency is a function of the microsphere position relative to each waveguide channel, as well as the waveguide channel separation at the interaction points.

The specific polar WGM involved in the power transfer process can be selected by maneuvering the sphere parallel to the waveguides so as to appropriately position the sphere along the longitudinal axis. In the illustrated embodiment, the separation between the waveguides increases by 48 μm, over a 3 mm chip length. Taking advantage of the increasing guide separation, low order polar modes can be filtered out of the drop port, while maintaining good transfer characteristics for higher orders, as illustrated in FIG. 4.

Figure 5:
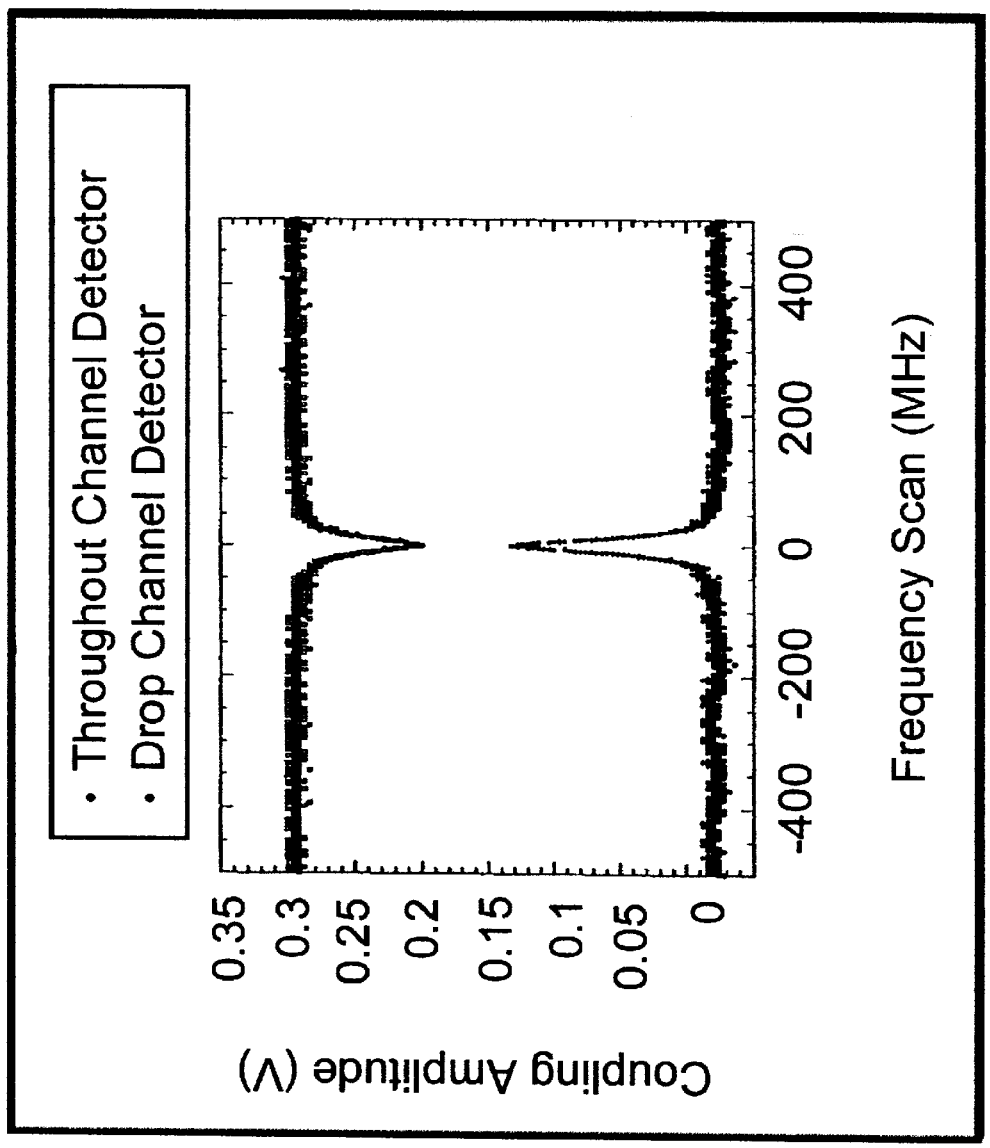
FIG. 5 provides a graph of the measured relative amplitudes for the throughput channel output and the drop channel output, for a channel add/drop filter constructed in accordance with the present invention.

FIG. 5 provides a graph of the measured relative amplitudes of the throughput and drop channel signals, for a channel drop filter constructed in accordance with the present invention. The experimental data presented in FIG. 5 have been obtained by measuring the detector signals from the second I/O port 19 (functioning as a throughput port) and the drop port 24, both illustrated in FIG. 1. A microsphere cavity having a diameter of about 260 μm, and SPARROW waveguides having a width of about 6 μm were used. A tunable 1.55 μm laser diode was used to generate the signal beam, and two identical photodetectors was used for simultaneous monitoring of both waveguide ports.

In FIG. 5, the lower trace represents the drop port detector output (i.e. the output detected by the photodetector 40 illustrated in FIG. 1), while the top trace is the throughput port detector output (i.e. the output detected by the photodetector 41 illustrated in FIG. 1). The resonant linewidths, as observed from the data in FIG. 5, are in the range of about 20–30 MHz. Further, the data in FIG. 5 shows that nearly 55% of the power extracted by the sphere is transferred into the drop guide, i.e. that the optical power transfer efficiency is about 55%. Transfer efficiencies greater than 95% and linewidths of about 1 MHz were also observed. By comparison, prior art devices currently used for optical channel routing are designed for a minimum channel spacing of about 25 GHz. The microsphere-based optical communication signal routing technique of the present invention thus has the potential for providing channel spacings that are smaller by several orders of magnitude, as compared to channel spacings in currently available channel routing devices.

In another embodiment (not shown) of the present invention, a multiple channel add/drop device can be fabricated, using multiple microspheres arranged in series on a single waveguide chip. In such an embodiment, each microsphere is preferably fabricated to possess different discrete resonant frequencies, so that channel cross-talk is minimized.

In summary, the present invention provides for a micro-optical solution to ultra-dense channel routing. A microcavity-based channel router device that provides very narrow bandwidth channel add/drop capability is featured. The channel add/drop device as disclosed in the present invention provides the potential to decrease current channel spacings by several orders of magnitude, because of the narrow bandwidth of the modes coupled into the microcavity resonators. Using the technique of the present invention, therefore, a significantly greater number of communication channels can be packed into the same transmission wavelength range, as compared to prior art devices.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An optical channel add/drop router, comprising:
    A. a substrate;
    B. a first optical waveguide and a second optical waveguide disposed on said substrate;
        wherein each optical waveguide comprises:
        (a) a multi-layer dielectric stack including alternating high and low refractive index dielectric layers; and
        (b) a waveguide core disposed on said dielectric stack; and
    C. at least one optical microcavity resonator constructed and arranged so as to optically interact with optical radiation propagating through one of said optical waveguides;
        wherein frequency components of said optical radiation that substantially match one or more resonant modes of said microcavity are evanescently coupled into said microcavity and out of said microcavity onto the remaining one of said optical waveguides.

2. A channel router according to claim 1,
    wherein said first optical waveguide includes a first I/O port and a second I/O port and defines a throughput channel between said first I/O port and said second I/O port;
    wherein said second optical waveguide has an originating end and a terminating end and includes an add/drop port at a terminating end thereof; and
    wherein said second optical waveguide defines an add/drop channel between said originating end and said add/drop port.

3. A channel router according to claim 2,
    wherein said channel add/drop router when in a first state acts as a channel add filter in which said second I/O port of said first waveguide is adapted to receive a first beam of light for propagation along said throughput channel toward said first I/O port, and said add/drop port of said second waveguide is adapted to receive a second beam of light, so that frequency components within said second beam of light that substantially match one or more resonant modes of said microcavity can be coupled into said microcavity, and out of said microcavity onto said throughput channel of said first waveguide, so as to add said matching components onto said first beam of light.

4. A channel router according to claim 2,
    wherein said channel add/drop router when in a second state acts as a channel drop filter in which said first I/O port of said first waveguide is adapted to receive a beam of light for propagation along said throughput channel toward said second I/O port, so that frequency components within said first beam of light that substantially match one or more resonant modes of said microcavity are coupled into said microcavity, and are coupled out of said microcavity onto said add/drop channel of said second waveguide, so as to be output from said add/drop port.

5. An optical channel router according to claim 2, further comprising a light source arranged to input light into at least one of said first I/O port, said second I/O port, and said add/drop port.

6. An optical channel router according to claim 5, wherein said light source is a laser.

7. An optical channel router according to claim 2, further comprising at least one detector constructed and arranged so as to detect optical radiation output from one of said add/drop port, said first I/O port, and said second I/O port.

8. A channel router according to claim 1, wherein the resonance linewidth of the optical power transfer from said first optical waveguide to said second optical waveguide is between about 1 MHz to about 30 MHz.

9. A channel router according to claim 1, wherein said optical microcavity is disposed at a distance from each optical waveguide that is sufficiently small so as to allow evanescent coupling between each optical waveguide and said optical microcavity.

10. A channel router according to claim 9, wherein said distance is less than one wavelength of said optical radiation.

11. A channel router according to claim 9, wherein said optical microcavity has a substantially spherical shape, and wherein the wavelengths of the whispering gallery modes of said microcavity is related to the radius r of said substantially spherical microcavity according to the formula:

$$2\pi r = n\lambda,$$

and n is a nonzero integer.

12. A channel router according to claim 1, wherein said one or more resonant modes of said optical microcavity comprises a whispering gallery mode.

13. An optical channel router according to claim 1, wherein said optical microcavity is selected from the group consisting of microspheres, microdisks, and microrings.

14. An optical channel router according to claim 1, wherein said optical microcavity is made of silica.

15. An optical channel router according to claim 1, wherein said low index dielectric layer and said waveguide core comprises silica.

16. An optical channel router according to claim 1, wherein said high index dielectric layer comprises silicon.

17. An optical channel router according to claim 1, wherein said optical waveguide is an integrated optical chip.

18. An optical channel router according to claim 1, wherein said optical waveguide and said optical microcavity form an integrated optical chip.

19. An optical channel router according to claim 1, wherein the coupling efficiency of said evanescent field of said optical radiation coupled into said optical microcavity is from about 10% to about 99%.

20. An optical channel router according to claim 1, wherein the reflectivity of said dielectric stack is sufficient to isolate the optical modes within said waveguide core from said substrate.

21. An optical channel router according to claim 1, wherein the reflectivity of said dielectric stack is sufficient to isolate the optical modes in said microcavity from said substrate.

22. An optical channel router according to claim 1, wherein said optical microcavity is fabricated by melting one end of an optical fiber.

23. An optical channel router according to claim 1, wherein said optical microcavity is characterized by a quality factor (Q) from about $10^5$ to about $10^{10}$.

24. An optical channel router according to claim 1, wherein optical power transfer efficiency between the first optical waveguide and the second optical waveguide is from about 10% to about 99%.

25. An optical channel router according to claim 1, wherein said optical microcavity is characterized by a diameter of about 50 µm to about 500 µm.

26. An optical channel router according to claim 1, wherein said optical microcavity is characterized by a diameter of about 260 µm.

27. An optical channel add/drop router, comprising:

A. a substrate;

B. at least one first optical waveguide and at least one second optical waveguide disposed on said substrate; wherein each optical waveguide comprises:
   (a) a multi-layer dielectric stack including alternating high and low refractive index dielectric layers; and
   (b) a waveguide core disposed on said dielectric stack; and C. a plurality of optical microcavity resonators constructed and arranged so as to optically interact with optical radiation propagating through one of said optical waveguides, each of said plurality of microcavity resonators being characterized by at least one resonant frequency;

wherein frequency components of said optical radiation that substantially match one or more resonant modes of a corresponding one of said plurality of microcavity resonators are evanescently coupled into said corresponding microcavity, and are coupled out of said corresponding microcavity onto a remaining one of said optical waveguides.

* * * * *